UNITED STATES PATENT OFFICE.

JOSEPH MOSES WARD KITCHEN, OF EAST ORANGE, NEW JERSEY.

METHOD OF STERILIZING AND SECURING UNIFORMITY OF EDIBLE QUALITY IN BUTTER.

1,125,693.  Specification of Letters Patent.  Patented Jan. 19, 1915.

No Drawing.  Application filed September 13, 1913.  Serial No. 789,653.

*To all whom it may concern:*

Be it known that I, JOSEPH MOSES WARD KITCHEN, a citizen of the United States, residing in the city of East Orange, county of Essex, State of New Jersey, have made new and useful Improvements in Methods of Sterilizing and Securing Uniformity of Edible Quality in Butter, of which the following is a specification.

This invention has for its object such treatment of butter as will render its consumption safe to health through the destruction of pathogenic germs in the butter, and without much deterioration in the texture or edible character of the butter. The process is performed in a very simple and inexpensive manner.

A further object is to secure uniformity in the quality of butter as delivered by distributers to consumers from time to time.

It is known that a large number of dairy cattle are infected with tuberculosis, and that a considerable part of dairy products, including butter, are infected with living tubercle and other disease producing germs, and also other germs which induce deteriorations in the quality of butter. It is the opinion of various authorities that all butter that is not produced from the milk of cattle known to be free from tuberculosis should at some stage of its making and handling, have been subjected to a heat of at least a pasteurizing temperature in order to destroy disease producing germs in the butter. It is a common practice in creameries to pasteurize milk or cream from which butter is made; but that is a practice involving the use of special and somewhat expensive apparatus; and if the process is to be made certainly effective, it should be carried out under skilled direction; and preferably, under the supervision of expert sanitary authority. To carry out these requirements is frequently difficult, and in fact, in multitudes of cases is impracticable, and in the making of perhaps the largest part of the butter that is produced in the United States, such as is made in farm dairies and in most of the smaller butter making creameries.

The present invention substitutes for the process of pasteurizing the cream before the butter is made, a method of first making butter from unheated cream, collecting the raw butter at various points of manufacture, and then treating the butter in centralizing plants; and preferably, in plants located close to points of distribution and consumption.

A considerable amount of butter is made from cream pasteurized at the primary butter manufacturing plant; but a very much larger amount is made from raw cream, and the two makes are marketed indiscriminately. To secure safety to the consuming public, very much the larger part of the butter produced should be heated before consumption. Moreover, to secure a continued uniformity of quality in the butter purveyed by dealers, various makes of butter, even including pasteurized butter, should be admixed. Old time methods of admixing involved either a mechanical mixture of several makes while unheated, or else a secondary heating of the butter. In either case, the texture and gustatory character of the admixed butter is more or less unnecessarily injured.

Ordinarily, a finished butter product is made at the creamery plant; but the present invention proposes a different plan of procedure. As a first step in the new plan, and preferably, none of the cream handled is pasteurized before it is churned; although in certain cases some of the cream may be pasteurized; but the degree of fermentation in the cream before churning is positively controlled, if possible, and checked by unusually low temperatures to avoid excessive acid formation, and gives keeping quality to the butter. The cream is churned raw and before too much acid has been formed in it either at the farm or during its conveyance to the centralizing plant. In the production of raw butter, a product of relatively uniform quality is usually made at each particular place of making; but this butter varies in quality at the several places of making, and is easily depreciated in quality under the influence of moderate or high temperatures. In my method, raw unfinished butter produced from lightly fermented cream, is collected frequently from its various sources of production, and conveyed under strictly controlled low temperature influences in insulated containers, to the place for finally treating the butter. Here the various makes of butter are melted and admixed while in fluid form. The admixed fluid butter is heated to a pasteurizing temperature of about 150° F. or higher, held for a sufficient time at that temperature, and is then gradually cooled, the butter being constantly stirred or agitated while cooling in order to prevent or obviate the gritty character that usually prevails in butter after its heating, and which is probably due to fatty crystallization, and to secure a re-admixture of the caseous, fatty and watery elements of the butter. After cooling, the butter is packed in the form desired, and then is mechanically refrigerated to a substantially non-fermentative temperature, one that is lower than can be secured by ordinary icing methods. A temperature approximating 0° F. is preferred. These steps involve a special control of temperatures all along the lines of butter production and handling, from the time of milk drawing until the time of consumption, and during which time heating of the butter is avoided whenever unnecessary. The admixture of the various makes is performed at the time of the sterilizing of the butter, or immediately prior to that performance; the admixed butter having been preferably heated only once during the entire process. The heating of the butter is usually effected at a secondary central plant, near the point of distribution.

There is a large amount of butter made on farms, and marketed through country stores, which is finally processed, being deoderated and otherwise treated and packed prior to its delivery to consumers. A great part of such butter has become much deteriorated in its quality before it undergoes the processing treatment because of various infections and because of being held at too high temperatures for too long a time; it undergoing directly and indirectly deterioration due to the formation of products from bacterial action. The ordinary methods of processing butter of this character are complicated and expensive.

In sterilizing milk and cream there is always more or less change in the taste and odor of the nitrogenous and sugary, non-fatty constituents, which changes of flavor and odor are more or less transferred to the butter fat being treated, and in proportion to the quantities of non-fatty milk constituents mixed with the butter fat prior to its churning. This is one reason why I prefer to use a raw butter in my method.

In establishing a trade in butter by distributers, it is desirable that the trader should be able to command a supply that will from time to time be as uniform in quality as possible; whereas butter as sent to market, is usually of many variations in quality, each manufacturer making a different grade, which even varies from time to time as to quality in the same factory. Consumers get habituated to almost any grade of butter if they are continuously served with that grade. Hence the desirability of purveying one grade at all times. The present invention aims to meet this condition by adopting the practice of admixing thoroughly, various makes of butter while in a heated state of fluidity, and coincident with sterilizing the butter, which performance includes its heating to a sufficient degree to destroy possible pathogenic infections of the butter.

I preferably confine my method to the treatment of butter which is of good flavor and odor and which has been made from unpasteurized cream. But the method comprises treatment of butter of poor quality, and comprises steps taken to eliminate if necessary, objectionable flavors and odors which may be in the butter before treatment is begun; although such treatment is not usually necessary, as it is easier to prevent the formation of undesirable qualities in butter as to mal-flavors and odors, than to eliminate them.

I heat the butter to at least 145° F. and hold it at that temperature for at least 20 minutes. Higher temperatures may be used, and the time of holding may be increased. If the butter to be treated is of sufficiently excellent quality as to flavor and odor, the fluid butter may require no aeration; but if objectionable as to odor or taste, it may be aerated while hot, or may be steamed or washed in hot water in the usual way. Preferably, it should be treated in the melted condition by running the fluid butter over aerating surfaces in an apartment where the general atmospheric temperature is held at 150° F. or over, and in which there is a volume of germ free, filtered air passing through the apartment. In either of the named processes, the warm liquid butter after aeration, is cooled with moderate rapidity while undergoing a continuous agitation or stirring during its cooling. The cooling may be conveniently effected in a metallic container standing in water, and the butter may be stirred by power-actuated stirrers, somewhat as in the method of making ice-cream. This performance results in re-admixing the caseous and watery constituents of the butter which separate from the butter fat during its heating. The stirring also prevents or overcomes the formation of gritty sand-like matters in the butter that are presumedly due to a crystallization in the butter-fat that follows heating of butter. This process is different from churning heated butter after its cooling, as is the common older practice.

To aid in overcoming the hard and gritty qualities that butter may acquire from its heating, I may admix with the cooling butter, some ingredient such as milk, butter milk, hydrated starch, or a fixed oil in quantities sufficient to give the required flavor, moisture and density to the cooled product. Unless the butter is subjected to a sufficient degree of heat to destroy all germs and their spores; the butter, after it is heated, is subjected to a sufficiently deep refrigeration to prevent the growth of those bacteria, such as hay or other putrefactive germs in the butter which resist low pasteurizing temperatures, and also to deter other, non-organic decompositions. The butter is stored at such low temperatures.

In the simple manner herein described, the entire butter supply may be rendered safe for consumption, and with little apparent deterioration in it, other than a slight change in texture.

The method is of special value in those agricultural districts in which the number of cows kept on individual farms are so few in number, or are so widely distributed, as to make it economically impractical to convey milk, or separated cream to the butter making plant for manufacture into butter. It is easy to make butter on the farm that is of comparatively good quality at least; and if this farm made butter be regularly and frequently collected and conveyed to central treating plants in a refrigerated, insulated receptacle, and is then immediately treated by my method, and shipped to market in a deeply refrigerated condition, the result is a safe product, and one of a very much more satisfactory edible character, than if the butter were marketed through the country stores as is so commonly the practice.

Subject matter is herein disclosed that is not herein claimed, but which is claimed in one or more of the following of my copending applications, viz; that which particularly relates to making and preserving butter, in Sr. No. 692,196, filed April 20, 1912; and that which particularly relates to methods of aerating, refrigerating and pasteurizing milk, in Sr. No. 740,962, filed January 9, 1913.

What I claim as new is:

1. The method of treating butter herein described, which consists in, heating the butter to a temperature destructive to pathogenic life in the butter, cooling the butter and stirring the butter during the process of its cooling until the ingredients of the butter are retained in an unseparated condition.

2. The method of treating butter herein described, which consists in melting butter, aerating the butter in an atmosphere free from living germs, said atmosphere having a temperature substantially inhibiting germinal growths, sterilizing the butter and cooling the butter and actively stirring or agitating the butter during its cooling.

3. The method of treating butter herein described, which consists in, subjecting the constituents of butter to a sterilizing heat, cooling the heated constituents and continually stirring and admixing the heated constituents during their cooling, refrigerating the stirred and admixed product at a temperature sufficiently low to prevent substantially all bacterial growths in the butter and holding said butter in such state of frigidity to a time relatively immediately prior to the consumption of the butter.

4. The method of treating butter herein described, which consists in, heating butter to and holding the butter at a temperature inhibiting bacterial activity, aerating the butter at a temperature preventive of undesirable bacterial growths, holding the butter at said temperature until elimination of objectionable volatile constituents is obtained, and subjecting the butter to a cooling influence and a continuous stirring or agitation until said butter shall have been cooled to a temperature sufficiently low to prevent separation of the constituents of the butter and until gritty crystallization in the butter is obviated.

5. The method of treating butter herein described, which consists in, collecting butter made at various places, conveying the butter to a central treating plant in a substantially undepreciated and non-fermenting condition, melting the butter made at and collected from the various places and admixing the melted butter, heating the admixed melted butter to and maintaining it at a germ destroying heat until vitality of germs in the butter has been destroyed, cooling the heated butter and stirring or agitating the butter while cooling until the constituents of the butter will remain admixed at the temperatures usually maintained in human habitations.

6. The method of treating butter herein described, which consists in, melting butter, admixing with the butter a material giving improved physical character to the butter, and cooling the admixed melted butter and material, said admixture being stirred or agitated during the cooling.

7. The method of treating butter herein described, which consists in, heating the butter to a sterilizing temperature, cooling the butter, the butter being stirred or agitated during the cooling, and refrigerating the butter to and holding the butter at a temperature below the freezing point of water.

8. The method of treating butter herein described, which consists in, melting butter, subjecting the butter while cooling to a process of aeration, and cooling the butter after its aeration, the butter being continually stirred or agitated during its cooling.

9. The method of treating butter herein described, which consists in, controlling fermentation in butter during its transportation and holding, heating the butter, cooling the heated butter and securing sufficient motion in the heated butter while cooling to prevent or obviate discernible fatty crystallization in the butter.

10. The method of treating butter herein described, which consists in, (1) heating a composition of butter fat and other milk constituents to and holding said butter and other constituents at sterilizing temperature, and (2) cooling said heated composition while continually stirring or agitating the said composition until the constituents are thoroughly admixed.

11. The method of treating butter herein described, which consists in, (1) heating a composition of butter fat and other milk constituents to and holding said composition at a sterilizing temperature, and (2) cooling said heated composition and stirring the composition while cooling and holding the said fat and other milk constituents in a condition of admixture, and (3) refrigerating to and holding the composition at a temperature below 40° F. until a time approximately immediately prior to the time of consumption.

JOSEPH MOSES WARD KITCHEN.

Witnesses:
Geo. L. Wheelock,
Beatrice Mirvis.